May 23, 1944.  W. R. TUCKER ET AL  2,349,641
ROTATING SERVO-VALVE
Filed Dec. 18, 1941  2 Sheets-Sheet 2
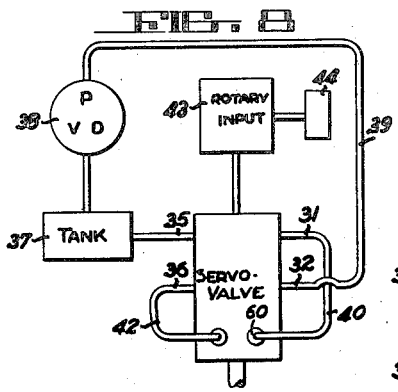
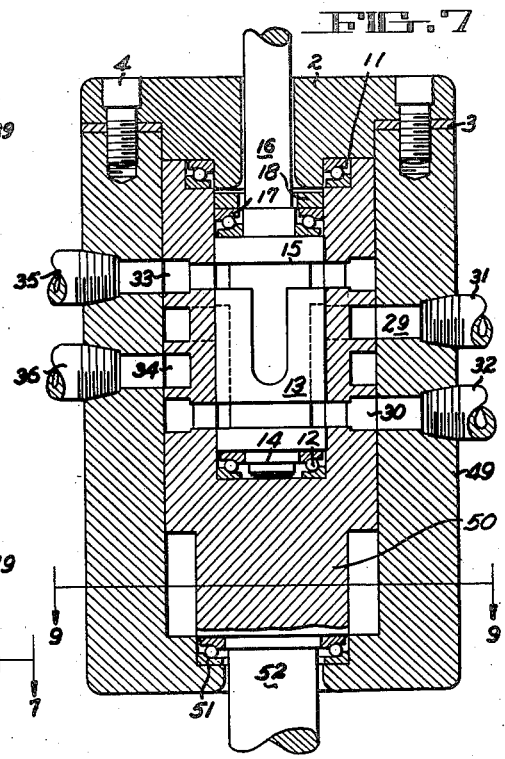
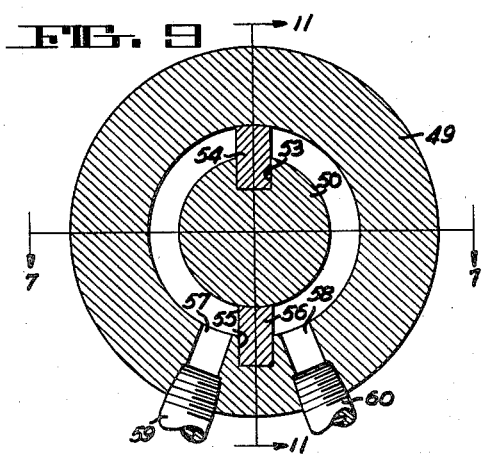
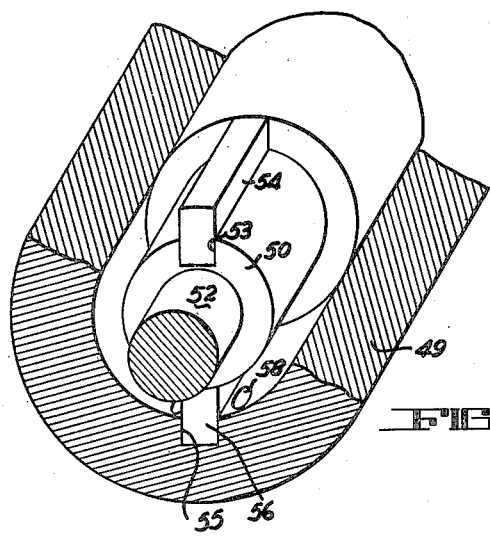
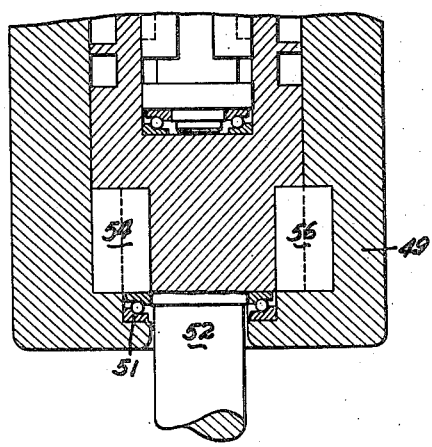
INVENTORS
WARREN R. TUCKER
GEORGE A. WALDIE
ATTORNEYS

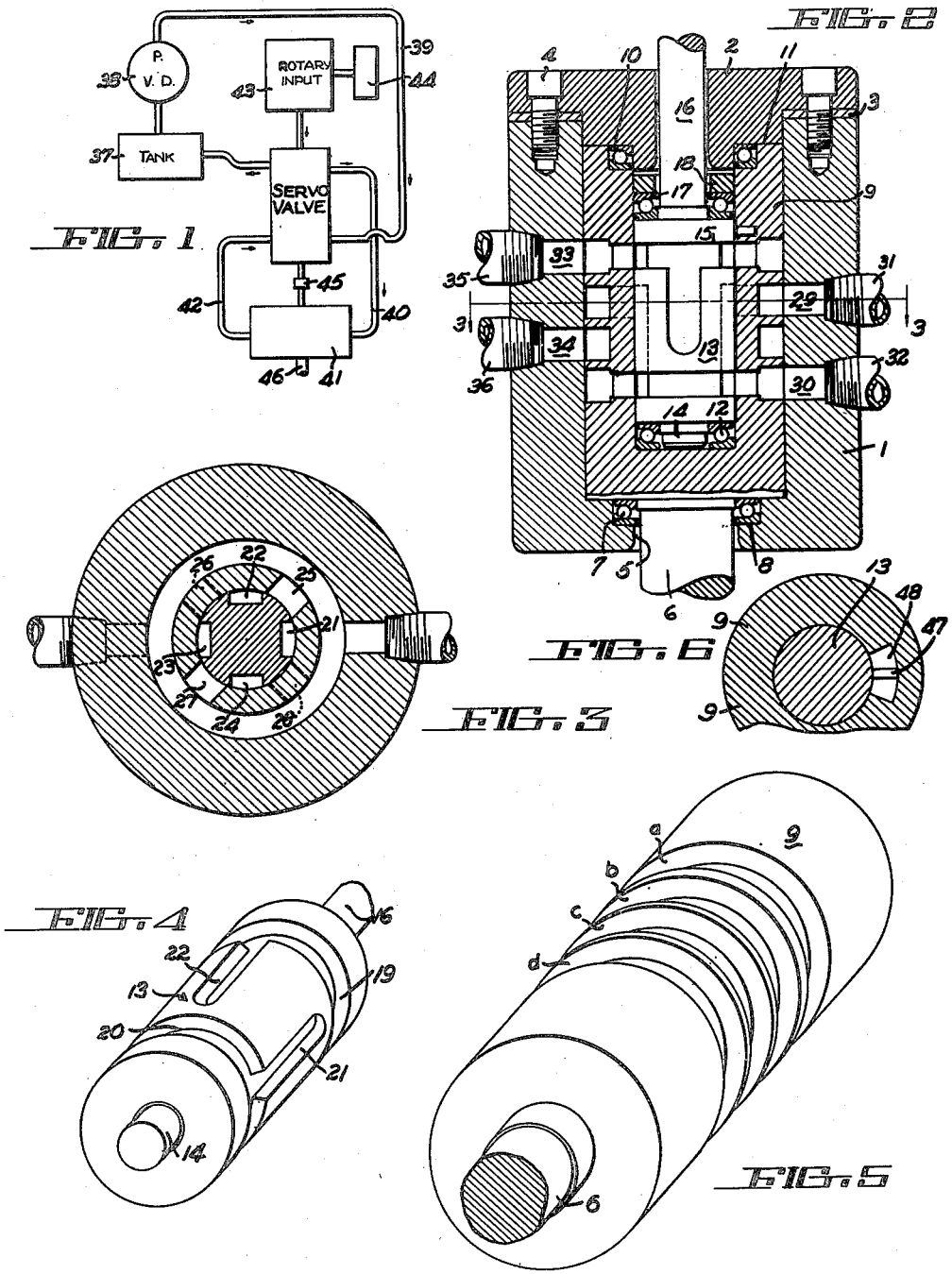

Patented May 23, 1944

2,349,641

UNITED STATES PATENT OFFICE 2,349,641

ROTATING SERVO-VALVE

Warren R. Tucker, Dayton, and George A. Waldie, Franklin, Ohio, assignors to The Hydraulic Development Corp. Inc., Mount Gilead, Ohio, a corporation of Delaware Application December 18, 1941, Serial No. 423,487

9 Claims. (Cl. 121—41)

The present invention relates to hydraulic apparatus, and more particularly to devices for controlling the pressure fluid in the apparatus.

It is customary, when controlling the application of pressure fluid to a hydraulic motor, to employ a so-called "servomotor" which forms part of the pump structure, and the purpose of which is to move the heavy flow-control member of the pump by a relatively small externally applied force. Consequently, the quantity and therefore the pressure of the fluid supplied to the motor are controlled at the pump by the servomotor. This indirectness of control of the hydraulic motor may result in a system which is not altogether flexible, failing to respond instantly to quick changes of load at the motor, such for example, as may be necessary in the case of moving the control surfaces of an airplane in response to movement of the control stick. Moreover, the type of servomotor which has heretofore been employed in connection with the control of pumps essentially consists of a cylindrical valve head surrounded by a ported sleeve, which in turn, is contained within a power piston connected directly to the pump flow-control member.

In operation the valve head is moved to the right or left, depending on the direction in which the flow-control member is to be moved, causing fluid pressure to be admitted to one side or the other of the piston through the ported sleeve, and thus moving the flow-control member to the desired position. It will be noted, notwithstanding the fact that the valve head constitutes a cylinder, it requires only a reciprocatory motion within the ported sleeve. A motion of this character may tend to wear the valve head unevenly so that in time leakage may develop, or at least inaccuracies of control. The same difficulties are present in those valves which are employed to reverse the flow of presure fluid delivered by a pump to a hydraulic motor, these valves being usually of the so-called "four-way" type. A piston of round configuration is positioned in a valve housing which is ported in such a manner as to control the direction of flow through the valve when the piston is moved longitudinally of its axis, as in the example referred to hereinbefore, uneven wear may develop between the piston and the valve housing, due to the reciprocatory character of the piston movement.

The primary object of the invention is to provide a highly efficient combination which includes a servo-valve and a hydraulic motor connected both mechanically and hydraulically with said valve in such a way that the speed with which the valve is rotated determines the speed of the hydraulic motor.

Other objects are to provide a rotary valve, of well balanced character, which may be rotated at any speed, great or small, and which will accurately apply fluid pressure to the hydraulic motor load, depending on the speed of the valve rotor; to provide a sturdy valve composed of relatively few parts, of inexpensive character, readily machinable to prevent initial leakage, and capable of operating in such a manner that the pressure of the fluid which tends to leak is distributed throughout the entire periphery of the rotatable member, thus reducing this tendency.

A more specific object is to provide the combination of an improved form of servo-valve for controlling the application of pressure fluid to a hydraulic motor and a special form of such a motor which operates with the highest efficiency when employed in connection with the improved servomotor.

The final object is to provide an improved servo-valve of the rotary type, which may be operated at exceedingly high speeds, due to the perfect balance of the rotor, and can handle large quantities of pressure fluid so that the size of the servo-valve is relatively small as compared with the quantity of fluid which passes through and is controlled by the valve.

The invention will be better understood when the following specification is read in connection with the accompanying drawings.

In the drawings:

Figure 1 shows a typical hydraulic system, in which the improved servo-valve may be employed.

Figure 2 illustrates a section taken through the length of the servo-valve but showing certain of the parts in elevation for clarity.

Figure 3 is a section taken along the line 3—3 in Figure 2.

Figure 4 represents a perspective view of the rotary element or rotor of the improved servo-valve.

Figure 5 is also a perspective view but taken of the sleeve portion of the servo-valve.

Figure 6 is a small fragmentary view of a stop pin structure by which the rotary movement of the rotor with respect to the sleeve is restricted.

Figure 7 illustrates a combined motor and improved servo-valve as a unitary structure.

Figure 8 is a diagrammatic layout of a hydraulic system in which the combined servo-valve and motor shown in Figure 7 may be employed.

Figure 9 is a sectional view taken along the line 9—9 in Figure 7.

Figure 10 is a combined perspective and sectional view, showing the relation between the rotary element of the motor and its stationary sleeve member.

Figure 11 is a fragmentary longitudinal sectional view of the motor structure taken along the line 11—11 in Figure 9.

Referring more particularly to Figure 2, reference numeral 1 designates a cup-shaped casing having fairly thick walls and which may be composed of cast iron, plastic-resinous material, or any other suitable material and in case weight is an essential item the casing may be formed of an aluminum or magnesium alloy. The upper or open end of the casing 1 is provided with a closure plate 2, seated on a leak-proof gasket 3 and secured in place by bolts 4. The lower end of the casing 1 is provided with an axially positioned opening 5 which receives a shaft 6, the shaft being journalled in a bearing, preferably of the ball bearing type as indicated at 7, which is seated on a shoulder 8.

The shaft carries a multi-grooved sleeve 9, these grooves (of which there may be four as illustrated in Figure 5) being designated $a, b, c$ and $d$ and extending for a relatively short distance inwardly from the periphery of the sleeve. The upper end of the sleeve (Figure 2) is carried on a ball bearing 10 which is seated against a shoulder 11 formed on the closure member 2. Thus by rotating the shaft 6 the sleeve 9 can be turned on its ball bearings. The sleeve 9 is provided with a deep counterbore, the lower end of which carries a ball bearing 12, and seated on this ball bearing there is a rotary valve member or rotor generally indicated 13 and shown in Figure 4.

The lower end of the rotor is provided with a stub shaft 14 which fits snugly within the ball bearing 12, and thus serves to assist in maintaining the lower end of the rotor in position. The upper end of the rotor (Figure 2) is provided with a shoulder portion 15 which terminates in a shaft 16 and is seated against a ball bearing 17, held in position by a washer 18. Thus by rotating the shaft 16 the rotor 13 can be rotated about its bearings 12 and 17. In order to minimize friction between the rotor 13 and the sleeve 9, also between the rotary sleeve 9 and the stationary casing 1, the contacting peripheral surfaces should preferably be machined to size. The rotor and sleeve elements are constituted of hard wearing material, such as chilled cast iron, plastic resins, or in case lightness of weight is necessary, these elements may be composed of a magnesium or aluminum alloy.

As shown in Figure 4, the rotor 13 is provided at each end respectively with circular grooves 19 and 20, and the body of the rotor between the grooves contains a plurality of spaced slots (four as illustrated) designated 21 to 24, inclusive. These slots are equidistantly spaced about the periphery of the rotor, and the alternate slots communicate respectively with the oppositely positioned grooves 19 and 20. Thus slots 22 and 24 (directly underneath the rotor shown in Figure 4) communicate with the groove 19, and the slots 21 and 23 (at the extreme left-hand side of the rotor as shown in Figure 4) communicate with the groove 20. These slots are milled down to a depth level with the bottoms of the grooves 19 and 20, and preferably terminate at their closed ends in a semi-circular configuration. There is a plurality of openings extending through the sleeve, these openings being designated 25, 26, 27 and 28 respectively, as shown in Figure 3. These openings are positioned in the grooves $a, b, c,$ and $d$ and in general, as a group, they are equidistinctly spaced about the periphery of the sleeve, their specific positions within each of the various grooves, being best described by way of their function when the operation of the servo-valve is explained. These openings have the same diameter as the width of the slots 21, 22, etc., and as can be seen in Figure 3, cooperate with these slots to control the direction of the fluid as it moves through the servo-valve.

The casing 1 is provided with a pair of openings 29, 30 at one side, directly above one another, and communicating respectively with the grooves $b$ and $d$. These openings receive conduits 31, 32, respectively, which lead to or from a hydraulic motor, as will be explained in connection with Figure 1. At the other side of the casing 1 there is a pair of openings 33, 34 which communicate respectively with the grooves $a$ and $c$ of the rotor, and which receive the conduits 35, 36, respectively.

In practice, the improved servo-valve may be satisfactorily employed in a hydraulic system, such as is shown in Figure 1. In this figure the reference numeral 37 designates a tank reservoir filled with oil, and 38 indicates a single direction variable delivery pump. The output of the pump is connected through the tubing 39 to the conduit 32 (Figure 2), and the conduit 31 of the servo-valve is connected through the tubing 40 to one side of a hydraulic motor, indicated at 41. This motor may be of any suitable and well known type, the direction of rotation of which can be controlled by the direction in which the pressure fluid is applied thereto. The other side of the motor 41 is taken through a tubing 42 to the conduit 36 of the servo-valve, and a connection is made between the conduit 35 and the tank 37 to complete the system. The shaft 16 of the rotor 13 is mechanically connected to any suitable and well known type of device 43, to which a rotary effort may be applied either by the hand or by machine. If desired, the rotation of the device 43 may be controlled, as to speed, by any mechanically connected speed controller indicated at 44. The shaft 6 of the sleeve 9 passes through a mechanical coupling 45 to the shaft of the hydraulic motor 41.

Assume that the tank 37 contains a fluid such as oil, and that the pump 38 is operated by a suitable form of prime mover, such as an electric motor. High pressure fluid will pass into the conduit 32, as indicated by the arrow (Figure 1), and if the rotor 13 has been moved to a position such that the slot 21 is directly opposite the openings 29, 30 in the sleeve, pressure fluid will pass through the opening 30, into the slot 21 and then out of the servomotor through the opening 29, into the conduit 31. There is also another path for this fluid, which may be considered to be a parallel branch of the first path, in that the fluid will pass around the groove $d$ (Figure 5) in both directions, and will flow through the slot 23 (at the opposite side of the rotor from the slot 21) and will enter the groove $b$. At this point the fluid will divide and will travel halfway around the groove, at each side thereof, and will converge at the opening 29 to join the fluid which had passed directly from the opening 30, through the slot 21, into the opening 29. The advantage of providing two separate paths in parallel for the fluid passing from conduit 32 to conduit 31 is that the rotor 13 is subjected, on all sides, to equal pressure and thus remains in a strictly balanced condition.

After leaving the conduit 31 the fluid passes through the tubing 40, into the hydraulic motor 41, where it performs work. The motor exhausts through the tubing 42 to the conduit 36. The exhaust fluid passes through the opening 34, into the groove c. The fluid at this point will divide into two portions, one portion moving upwardly around the groove c until it meets the slot 22 of the rotor, and will then flow into the groove 19, and then downwardly along the groove until it reaches the opening 33 and the conduit 35. The other portion of the fluid which has entered the opening 34 will move downwardly along the groove c until it reaches the slot 24, and then will pass along the slot into the groove 19, finally combining with the other portion of the fluid at the opening 33. Inasmuch as the conduit 35 is connected with the tank 37 a complete hydraulic circuit has been traced through the entire system, including the improved servomotor.

It is apparent that the hydraulic motor 41 receives the maximum amount of pressure fluid through the servo-valve when the slots 21 to 24 of the rotor are exactly in line with the openings 25 to 28 of the sleeve. If the shaft 6 were turned in such a way that the slots 21 to 24 were completely out of register with the openings 25 to 28, which is the condition shown in Figure 3, no fluid at all can be passed through the servo-valve. In fact, the two passageways involving the slots 21 and 23 are blocked, and also the passageways 22 and 24, so there is not the slightest chance of fluid leaking through the servo-valve, even when the pressure in the conduit 39 is extremely high.

It is apparent that any position assumed by the rotor with respect to the sleeve and intermediate of the fully open and fully closed positions, as explained above, will result in a throttling effect at the servo-valve to cut down the amount of pressure fluid reaching the motor 41. In actual operation it is intended that the rotor 13 shall be rotated continuously, and assuming for the moment that the rotor is moved clockwise (Figure 3) to bring the slot 22 into register, at least in some degree, with the opening 25, and assuming further that the hydraulic motor 41 has been caused to rotate, the rotary element of the motor 41 will turn the shaft 6 and will also rotate the sleeve 9 which is connected to the shaft.

In starting the motor 41 it is usual for the sleeve 9 to temporarily lag behind the rotor 13 so that as the rotor rotates at a faster rate than the sleeve, the slots 21 to 24 will periodically come into full register with the openings 25 to 28, thus momentarily increasing the fluid supplied to the motor, causing the latter to increase its speed of rotation. Finally, the sleeve 9 will have caught up with the rotor 13 until these two elements will be rotating substantially in synchronism. It will be understood that it takes only an instant of time for the sleeve 9 to come into step with the rotor, because the increase in supply of fluid furnished to the motor when the slots are in register with the openings is almost instantaneous.

If the rotation of the shaft 16 were now reduced, in response to the speed controller 44, the motor 41, with the connected sleeve 9, may for an instant retain its original speed, in which case the slots 21 to 24 would fall out of register with the openings 25 to 28 and the pressure fluid through the servomotor would be decreased to cause the motor 41 to decrease its speed to that of the rotor 13. Thus, as in the case of an increase in speed of the rotor 13 when synchronism is established between the rotor and the sleeve, the same synchronizing effect is present between these two rotary elements when the speed of the rotor 13 is decreased. The speed of the sleeve 9 therefore follows faithfully, and with almost no lag at all, the changes in speed of the rotor 13. Consequently, the speed of the motor 41 can be accurately controlled by the highly sensitive and extremely accurate speed controller 44. There are no unbalanced forces acting on the rotor 13 since, as explained above, the fluid pressure operates on both sides and top and bottom of the rotor. Hence, only a small turning effort is necessary at the shaft 16, and if desired a hand wheel may be applied to the shaft to control the movement of the extremely powerful hydraulic motor 41. When the rotation of the shaft 16 is stopped, it will be found that the sleeve 9 will also finally stop because, as explained above, when the shaft is progressively decreased in speed the sleeve will rotate at a correspondingly slower speed.

It will now be shown that when the shaft 16 is rotated in a direction opposite that described above, the motor 41 will be supplied with fluid in the opposite direction and thus caused to turn in the same direction as the shaft 16. Assume that the rotor 13 is moved counterclockwise (see Figure 3) until the slot 21 is in register with the opening 25 instead of being in register with the opening 26, as was the case before the shaft 16 was reversed. Under these circumstances pressure fluid, which still enters the conduit 32, will pass through the slot 21, through the opening 26 and into the groove c, where it will split up into two portions, one of which will move around the upper surface of the groove c to reach the opening 34, and the other portion will move around the lower surface of the groove c to reach the same opening. There is another path for this fluid, and parallel to that given immediately above, in passing from the conduit 32 to the conduit 36. In this case the fluid will also divide into two portions, one of which will pass over the upper surface of the groove d and the other around the lower surface of the groove d, these fluid portions meeting at the slot 23 and passing along the rotor, finally reaching the opening 34. Thus the pressure fluid moves from the conduit 32, through the servo-valve to the conduit 36, traveling through the tubing 42 into the motor 41. The latter is therefore rotated in a reverse direction from that described hereinbefore.

The motor exhausts fluid through the tubing 40, into the conduit 31, the fluid passing through the opening 29, where it divides into two portions, one of the portions moving upwardly around the groove b until it meets the slot 22, where it will then reach the groove 19 and finally gain the opening 33. The other portion of the fluid will move around the lower surface of the groove b until it reaches the slot 24, thus traveling to the groove 19 and joining the other fluid at the opening 33. Hence, as in the case of the clockwise movement of the rotor 13, there are balanced fluid forces acting on the rotor when the latter is rotated counterclockwise to cause a reverse rotation of the motor 41. The motor 41 is caused to rotate in synchronism with the rotor 13 when the latter is turned in a counterclockwise direction for the same reasons as were explained at length in connection with the clockwise movement of the rotor.

In case the load coupled to the shaft 46 of the motor 41 is so heavy as to prevent exact synchronism between the sleeve 9 and the rotor 13, the sleeve would ordinarily come to rest notwithstanding a continuous rotation of the shaft 16. This is due to the fact that the slots 21 to 24 are not in register with the openings 25 to 28 for a sufficient length of time to apply an increased amount of pressure fluid to the motor 41 and thus to assist in carrying the extra load. The motor 41 obtains its full supply of pressure fluid only when the slots 21 to 24 are maintained exactly in register with the openings 25 to 28, which necessitates a synchronous movement between the rotor 13 and the sleeve 9. In order to prevent the sleeve from falling too far out of synchronism with the rotor when the load on the motor 41 is increased, it may be desirable to provide the rotor 13 with a pin 47 (Figure 6) which moves in a slot 48 of restricted length formed in the sleeve 9.

In certain applications of the invention it may be desirable to employ the improved servo-motor described hereinbefore in connection with a hydraulic motor, in which the angle of rotation is limited. For example, in case it is desired to move the control surfaces of an airplane, this movement may extend for only a relatively few degrees, and always less than 90 degrees. The improved servo-motor provides an added advantage for a small angle of movement of this character, and in Figures 7 to 11 there is illustrated the combination of the servo-motor with a hydraulic motor which is designed to rotate less than 360 degrees. The casing 49 of the servo-valve is made longer than that shown in Figure 2 to accommodate at the bottom an improved hydraulic motor which operates advantageously when controlled by the servo-valve. The upper part of the casing 49 contains the servo-valve structure, which was described in connection with Figures 1 to 5, except that the shaft 6 is removed from the sleeve. The latter terminates in a circular hub member 50 of smaller diameter than the sleeve. The lower surface of the hub member is seated on a ball bearing 51, and a shaft 52 is connected thereto, the shaft being also journalled in the ball bearing. The hub 50 is provided with a longitudinally extending slot 53, into which a key 54 is tightly fitted. The outside edge of the key extends as far as the inner diameter of the casing 49. The latter is also provided with a slot 55, into which a key 56 extending the length of the hub is tightly driven. This key has a width in the vertical direction (Figure 9) such as just to clear the hub 50. The casing 49 is provided with openings extending in a radial direction and receiving the conduits 59 and 60 respectively.

Referring now to Figure 8, the fluid tank is illustrated at 37 for supplying fluid to a pump 38, the output of which passes through the tubing 39, into the combined servo-valve and hydraulic casing 49. The tubing 40 extends from the conduit 31 to the conduit 60 of the motor, and the tubing 42 extends from the conduit 59 of the motor to the conduit 36 of the servomotor. There is also a tubing extending between the conduit 35 of the servo-motor and the tank 37, as in the case of Figure 1.

Assume now that the rotor 13 has been moved counterclockwise (Figure 3) so that the slot 21 is in register with the opening 25. Under these conditions pressure fluid is supplied by the pump 38, through the tubing 39 to the conduit 32. This fluid passes through the various slots 21 to 24 and the openings 25 to 28 into the servo-valve, as was explained hereinbefore, and finally emerges at the conduit 31 and passes through the tubing 40, into the opening 58 of the motor (Figure 9). Since this is the pressure line of the system, the pressure will act on the nearer side of the key 54, causing the rotary element of the motor to turn in the counterclockwise direction. The exhaust from the pump is taken through the opening 57, into the conduit 59 and through the tubing 42 to the conduit 36 (Figure 2), and then through the various slots 21 to 24 and openings 25 to 28, to the conduit 35 and thence back to the tank 37.

In case the rotor 13 is moved in the clockwise direction (Figure 3) so that the slot 22 will be in full register with the opening 25, pressure fluid reaching the conduit 32 will now pass through the various slots and openings of the rotor and the sleeve to emerge at the conduit 36 and to supply pressure fluid to the opening 57. Since the tubing 42 now becomes the pressure line, the fluid will exert pressure on the key 54 in such a manner as to cause the rotary element to move in a clockwise direction. The motor will exhaust fluid through the conduit 58 and the tubing 40 to the conduit 31, thence through the various slots 21 to 24 and the openings 25 to 28, finally emerging at the conduit 35, to return to the tank 37.

As in the case of the continuous rotation of the shaft 16 when the rotor and the sleeve were caused to turn synchronously, the same effect is present in the modified structure shown in Figures 7 to 11, in that the rotary element of the motor will move through a partial revolution in close synchronism with a corresponding movement of the shaft 16. Such an effect is highly desirable in case the motor shaft 52 is connected to an element, such as the control surface of an airplane, which requires only a relatively small angular movement in response to a correspondingly small angular movement of the shaft 16. It has been shown that the rotary element 50 of the motor can be made to turn in either direction, through any desired angular movement or number of revolutions depending on the manner in which the shaft 16 is rotated, and as in the case of the modification previously described, only a small rotary effort is necessary at the shaft 16 effectively to control the high pressure fluid delivered to the powerful hydraulic motor contained in the same casing as the servo-valve. By combining the servo-valve and the hydraulic motor in a single casing, considerable savings in weight and space are obtained. It is apparent that the motor is of rugged construction since the key 54 is tightly secured in the hub 50 and the key 56 is permanently secured in the casing 49, leaving little or no opportunity for any of the parts to loosen.

It will be understood that we desire to comprehend within our invention such modifications as come within the scope of the claims.

Having thus fully described our invention, what we claim as new and desire to secure by Letters Patent, is:

1. A servo-valve for pressure fluid systems comprising a cylindrical casing containing a cylindrical valve rotor, a cylindrical sleeve interposed between said casing and rotor, a plurality of ports in said casing on each side thereof, said sleeve having a plurality of peripherally extending grooves which communicate respectively with said ports, said rotor being provided with a pair of peripherally extending longitudinally spaced grooves, a plurality of slots extending longitudinally of the valve rotor, each alternate slot communicating with one of the grooves in the rotor and the remaining slots communicating with the other of the grooves in the rotor, and openings in the sleeve extending between the slots in the rotor and the grooves in the sleeve whereby when the rotor is rotated to bring the slots into alignment with the openings in the sleeve passageways are established between the ports in the casing which control the passage of fluid through the servo-valve.

2. A servo-valve for pressure fluid systems comprising a cylindrical casing containing a cylindrical rotor, a cylindrical sleeve interposed between said casing and rotor, a plurality of ports in said casing on each side thereof, said sleeve having a plurality of peripherally extending longitudinally spaced grooves which communicate respectively with said ports, said rotor being provided with a pair of peripherally extending grooves, a plurality of slots extending longitudinally of the rotor, each alternate slot communicating with one of the grooves in the rotor and the remaining slots communicating with the other of the grooves in the rotor, and openings in the sleeve extending between the slots in the rotor and the grooves in the sleeve, said rotor and said sleeve being adapted to be rotated with respect to one another and with respect to the casing so that when the slots in the rotor are brought into register with the openings in the sleeve passageways are established through the servo-valve for the pressure fluid.

3. A servo-valve for pressure fluid systems comprising a cylindrical casing containing a cylindrical valve rotor, a cylindrical sleeve interposed between said casing and rotor, a pair of ports in said casing on each side thereof, said sleeve having as many peripherally extending grooves as there are ports in said casing, which grooves communicate respectively with said ports, said rotor being provided with a pair of peripherally extending longitudinally spaced grooves, and a plurality of slots as many as there are grooves in said sleeve extending longitudinally of the rotor, each alternate slot communicating with one of the grooves in the rotor and the remaining slots communicating with the other of the grooves in the rotor, and openings in the sleeve as many as there are slots in the rotor and extending between the slots and the grooves in the sleeve whereby when the rotor is rotated in one direction to bring the slots into alignment with a particular group of openings in the sleeve passageways are established through the ports to cause pressure fluid to pass through the servo-valve in one direction and when the rotor is rotated in the opposite direction to bring its slots into alignment with another group of openings in the sleeve passageways are established between the ports to cause pressure fluid to pass through the servo-valve in the opposite direction.

4. A servo-valve for pressure fluid systems comprising a cylindrical casing containing a cylindrical valve rotor, a cylindrical sleeve interposed between said casing and rotor, a pair of ports in said casing on each side thereof, said sleeve having as many peripherally extending grooves as there are ports in said casing, which grooves communicate respectively with said ports, said rotor being provided with a pair of peripherally extending longitudinally spaced grooves and a plurality of slots as many as there are grooves in said sleeve extending longitudinally of the rotor, each alternate slot communicating with one of the grooves in the rotor and the remaining slots communicating with the other of the grooves in the rotor, and openings in the sleeve as many as there are slots in the rotor and extending between the slots and the grooves in the sleeve whereby when the rotor is rotated in one direction to bring the slots into alignment with a particular group of openings in the sleeve passageways are established through the ports to cause pressure fluid to pass through the servo-valve in one direction and when the rotor is rotated in the opposite direction to bring its slots into alignment with another group of openings in the sleeve passageways are established between the ports to cause pressure fluid to pass through the servo-valve in the opposite direction, said rotor and sleeve being adapted to move with respect to one another and with respect to said casing.

5. In combination, a servo-valve for pressure fluid systems comprising a cylindrical casing containing a cylindrical rotor, a cylindrical sleeve interposed between said casing and rotor, a pair of ports in said casing on each side thereof, said sleeve having as many peripherally extending grooves as there are ports in said casing, which grooves communicate respectively with said ports, said rotor being provided with a pair of peripherally extending longitudinally spaced grooves and a plurality of slots as many as there are grooves in said sleeve extending longitudinally of the rotor, each alternate slot communicating with one of the grooves in the rotor and the remaining slots communicating with the other of the grooves in the rotor, openings in the sleeve as many as there are slots in the rotor and extending between the slots and the grooves in the sleeve whereby when the rotor is rotated in one direction to bring the slots into alignment with a particular group of openings in the sleeve passageways are established through the ports to cause pressure fluid to pass through the servo-valve in one direction and when the rotor is rotated in the opposite direction to bring its slots into alignment with another group of openings in the sleeve passageways are established between the ports to cause pressure fluid to pass through the servo-valve in the opposite direction, said rotor and sleeve being adapted to move with respect to one another and with respect to said casing, and a hydraulic motor mechanically connected to said sleeve and supplied with pressure fluid from said servo-valve whereby as the rotor is rotated to bring the slots into alignment with the openings in the sleeve pressure fluid is passed through the servo-valve to the hydraulic motor in order to rotate the sleeve, whereby corresponding angular position is established between the rotor and the hydraulic motor.

6. In combination, a servo-valve for pressure fluid systems comprising a casing containing a valve rotor, an intermediate member interposed between said casing and rotor, a plurality of ports in said casing on each side thereof, said intermediate member having a plurality of grooves which communicate respectively with said ports, said rotor being provided with a pair of longitudinally spaced grooves in line respectively with two of the grooves of said intermediate member, a plurality of slots extending longitudinally of the rotor, each alternate slot communicating with one of grooves in the rotor and the adjacent slots communicating with the other of the grooves in the rotor, openings in the intermediate member extending between the slots in the rotor and the grooves in the intermediate member, and a hydraulic motor supplied with pressure fluid from said servo-valve and mechanically connected to said intermediate member whereby as the rotor is moved to bring the slots into alignment with the openings in the intermediate member pressure fluid is passed through the servo-valve to the hydraulic motor in order to move said member.

7. In combination, a servo-valve comprising a cylindrical casing and containing a cylindrical valve rotor, a sleeve interposed between said valve rotor and casing, a hydraulic motor contained within said casing, said sleeve forming the rotor of said hydraulic motor, a pair of ports in said casing on each side thereof, said valve rotor being provided with a plurality of longitudinally extending slots, openings in said sleeve which cooperate with the slots in the valve rotor for establishing communication between said ports when the slots are in register with said openings, the portion of the sleeve which constitutes the rotor of the hydraulic motor being provided with a longitudinally extending bar which divides the space between the rotor and the casing into pressure and exhaust chambers, conduits extending between said ports and said chambers, and other conduits extending between the remaining ports and a source of pressure fluid whereby as the valve rotor is rotated pressure fluid is supplied to the hydraulic motor which causes the sleeve to rotate to an angular position corresponding to the position assumed by the valve rotor.

8. In a servomotor, a combined servo-valve and hydraulic motor contained in a single casing, said servo-valve comprising a cylindrical valve rotor and an intermediate sleeve interposed between the valve head and said casing, said sleeve being extended to serve as the rotor of the hydraulic motor, said valve rotor being provided with a plurality of pairs of longitudinally extending slots and said sleeve being provided with openings and peripherally extending grooves which communicate with the slots of the valve rotor when the latter is rotated into a position of register, a pair of ports in said casing on each side thereof, said ports communicating respectively with the grooves in said sleeve, conduits taken between a pair of said ports and said hydraulic motor, the remaining pair of ports being connected to a source of high pressure fluid, said sleeve being provided with a small diameter portion at the motor end of the casing, a key fitted in said sleeve and bearing against said casing, and a key fitted in said casing and bearing against said sleeve whereby pressure and exhaust chambers are formed in the annular space between the sleeve and casing, the conduits connected with said motor communicating respectively with said pressure and exhaust chambers whereby as the valve rotor is rotated to bring its slots into register with the openings and grooves of said sleeve pressure fluid is supplied to the hydraulic motor and the sleeve is caused to rotate at a rate corresponding to the rate at which the valve rotor is rotated.

9. In combination, a servo-valve for pressure fluid systems comprising a cylindrical casing containing a cylindrical valve rotor, a cylindrical sleeve interposed between said casing and rotor, a pair of ports in said casing on each side thereof, said sleeve having as many peripherally extending grooves as there are ports in said casing, which grooves communicate respectively with said ports, said valve rotor being provided with a pair of peripherally extending longitudinally spaced grooves and a plurality of slots as many as there are grooves in said sleeve extending longitudinally of the valve rotor, each alternate slot communicating with one of the grooves in the rotor and the remaining slots communicating with the other of the grooves in the rotor, openings in the sleeve as many as there are slots in the valve rotor and extending between the slots and the grooves in the sleeve whereby when the valve rotor is rotated in one direction to bring the slots into alignment with a particular group of openings in the sleeve passageways are established through the ports to cause pressure fluid to pass through the servo-valve in one direction and when the rotor is rotated in the opposite direction to bring its slots into alignment with another group of openings in the sleeve, passageways are established between the ports to cause pressure fluid to pass through the servo-valve in the opposite direction, said rotor and sleeve being adapted to move with respect to one another and with respect to said casing, a hydraulic motor mechanically connected to said sleeve and supplied with pressure fluid from said servo-motor whereby as the valve rotor is rotated to bring the slots into alignment with the openings in the sleeve pressure fluid is passed through the servo-valve to the hydraulic motor in order to rotate the sleeve whereby synchronism in the angularity of movement is established between the valve rotor and the sleeve, and means for preventing excessive lag between the valve rotor and the sleeve when the load on the motor becomes excessive, said means comprising a pin which extends from the valve rotor and is adapted to move within a slot of restricted length in the sleeve.

WARREN R. TUCKER.
GEORGE A. WALDIE.